Patented Apr. 2, 1946

2,397,891

UNITED STATES PATENT OFFICE 2,397,891

OXIDATION OF ACROLEIN TO ACRYLIC ACID

Karl Heinrich Walter Tuerck, Banstead, England, assignor to The Distillers Company Limited, Edinburgh, Scotland, a British company No Drawing. Application November 16, 1943, Serial No. 510,553. In Great Britain September 21, 1940

13 Claims. (Cl. 260—530)

This application is a continuation-in-part of application Serial No. 411,758 now Patent #2,341,339, patented February 8, 1944 and concerns improvements relating to the oxidation of acrolein to acrylic acid.

It is known that acrylic acid may be prepared by oxidizing acrolein with molecular oxygen in the presence of catalysts such as compounds of heavy metals (see British Patent No. 407,352). The yields in this process are, however, so low and polymerisation of acrolein takes place so readily that its technical application had to be abandoned (see British Patent No. 482,736).

It has been suggested that the oxidation of methacrolein should be carried out in the presence of vanadium pentoxide as catalyst (see Groll et al. Patent No. 2,212,900). I have found that, when using this method for the oxidation of acrolein at temperatures below 50° C., not only does no oxidation of the acrolein occur in a reasonable reaction time, but also, owing to the prolonged action of oxygen, the acrolein is polymerised.

It has further been suggested that soluble peroxides of organic acids should be used as catalysts for the oxidation of unsaturated aldehydes. I found, however, that in the case of acrolein, no advantage could be gained in this way and the disadvantage of the polymerisation of acrolein could not be overcome.

It is an object of the present invention to provide a process for the oxidation of acrolein with gaseous oxygen, in which practically no polymerisation, either of acrolein or acrylic acid, occurs, and the loss of acrolein by evaporation is reduced to a minimum.

It is a further object of the invention to provide a process in which the initial rate of oxidation of acrolein is so considerably increased, that acrolein is not exposed to the action of oxygen for an undue length of time.

It is a further object of the invention to provide a catalyst whose activity does not diminish during the oxidation.

According to my invention, a solution of vanadic acid is added to the solution containing the acrolein to be oxidised, so that the mixture contains vanadic acid in solution, and, subsequently, oxygen is brought into intimate contact with this solution at a temperature not exceeding 35° C.

I have found that if vanadic acid is dissolved in the reaction mixture, an immediate absorption of oxygen takes place at temperatures between 15° and 35° C. so that the acrolein present is converted to acrylic acid instead of being polymerised and/or evaporated as is the case if vanadium pentoxide, which is not soluble in the reaction mixture, is used.

The catalyst which, according to the invention, must be present in the reaction mixture at the commencement of the oxidation reaction, may be prepared in two ways.

In one method a metallic vanadate is decomposed by means of an acid in a medium which itself is a solvent for free, freshly-prepared vanadic acid, e. g. water and/or a lower organic acid such as acetic acid. Thus, I prefer to prepare the catalyst by heating an alkali vanadate in acetic acid so that a red-brown solution is formed, and to add part of this solution immediately to the solution of acrolein, whereupon I introduce oxygen into said reaction mixture.

According to my second method I disperse commercial vanadium pentoxide, which itself is insoluble in water or acetic acid, in a solution of hydrogen peroxide in water and/or a lower aliphatic carboxylic acid, preferably acetic acid, so that a deeply coloured homogeneous solution is formed, and add this solution immediately to the reaction mixture containing the acrolein, whereupon the reaction is started by the introduction of oxygen into the reaction mixture.

If the catalyst solution prepared as above indicated contains water, I prefer to remove this water by adding a sufficient amount of acetic anhydride. In most cases the oxidation proceeds satisfactorily in the presence of small amounts of water, as long as this water does not cause the formation of a separate liquid phase.

I prefer to carry out the oxidation in the presence of such amounts of a solvent that the contents of acrolein in the reaction mixture does not initially exceed 50% by weight. Suitable solvents are the lower aliphatic acids, especially acetic acid. It is a special advantage of the catalyst, used according to my invention, that it causes a quick start of the oxidation even at concentrations of acrolein in acetic acid as low as 20% by weight thus allowing the use of such diluted solutions that the danger of polymerisation can be easily controlled during storage. If a water-insoluble solvent, like xylene or anisole, is used, it is essential to incorporate, into the reaction mixture, a water-miscible solvent such as acetic acid or acrylic acid so as to maintain the vanadic acid in solution, as I have found that even small amounts of polymer, which are precipitated when a substantially water-insoluble solvent is employed, occlude the catalyst so that oxidation can no longer proceed. Under these circumstances complete polymerisation sets in spontaneously, usually in the form of an explosive reaction.

It is advantageous to maintain the high activity of the vanadic acid catalyst by using as high an oxygen concentration as possible. This can be carried out by using air as the source of oxygen under super atmospheric pressure, e. g. 3 atmospheres or more, or by using a gas mixture richer in oxygen than air, either at normal or increased pressure, or by using pure oxygen. I prefer to use oxygen at normal or only slightly increased pressure.

Preferably, the temperature is not allowed to exceed 30° C., although it may cautiously be raised to 35° C. if the concentration of the acrolein is kept below 20%.

It is a further advantage of the catalyst to be used according to my invention that it allows the use of such low temperatures at which substantial polymerisation can be avoided.

The invention may be applied to a batch or to a continuous process. In both cases it allows the reaction to start without the danger of that sudden polymerisation which is inherent in all the processes hitherto known in the art of oxidising acrolein to acrylic acid.

The following experiments show a comparison of the oxidation of acrolein with soluble and insoluble catalysts.

(a) In a glass vessel which is provided with a cooling-coil and which is mounted on a fast shaking-machine, a solution of 40 g. acetic acid, 32 g. acrolein and 0.5 g. manganese acetate is mixed in an atmosphere of oxygen, the pressure being 1300 mm. Hg. The temperature is kept at 30° C. The rate of absorption of oxygen is shown at various stages in the reaction and is given as the time required for the absorption of 12 cm.³ of oxygen.

|  | Seconds |
|---|---|
| 0 hours | 360 |
| After 1 hour | 150 |
| After 2 hours | 85 |
| After 5 hours | 55 |
| After 9 hours | 90 |

After this time, the contents of the vessel start to polymerise rapidly and the final product is a gelatinous mass.

(b) The experiment as under (a) is repeated with the difference that, instead of manganese acetate, commercial vanadium pentoxide is used as catalyst. No appreciable absorption of oxygen takes place within five hours, but, on working up the reaction mixture, it is found that 30% of the acrolein is polymerised to a resin which can be dissolved in alkali to a deeply coloured solution.

(c) In the apparatus as described under (a), 0.5 g. vanadium pentoxide was added to a solution of 40 g. acrolein in 50 g. benzene, the vanadium catalyst being undissolved by the solution. The rate of absorption of oxygen, given as the time required for the absorption of 12 cm.³ of oxygen, was as follows:

|  | Seconds |
|---|---|
| 0 hours | No absorption |
| After 1 hour | 110 |
| After 5½ hours | 130 |
| After 20 hours | 600 |

From the reaction mixture only 14.0 gm. monomeric acrylic acid could be isolated, the remainder being an undistillable residue.

(d) In the apparatus described under (a) 4 ccm. of a 1% by weight solution of an aqueous homogeneous solution of vanadic acid was added to a solution of 40 g. acrolein in 50 g. acetic acid. This vanadic acid solution was freshly prepared by adding to an aqueous solution of sodium vanadate the amount of dilute sulphuric acid necessary to precipitate vanadic acid in voluminous form and redissolving the precipitate in an excess of water. On adding the catalyst solution to the reaction mixture, the vanadic acid remains in solution. When admitting oxygen to the agitated reaction mixture, maintained at 30° C., oxidation sets in immediately, the rate of oxygen absorption, given as in experiment (a), being as follows:

|  | Seconds |
|---|---|
| After 2 minutes | 25 |
| After 10 minutes | 15 |
| After 30 minutes | 15 |
| After 4 hours | 110 |

At the end of this time, 70% of the original quantity of acrolein was oxidised to acrylic acid without the formation of any appreciable quantity of polymerisation products. Taking into account the unchanged acrolein, the efficiency of the process was 89%.

(e) The voluminous precipitate obtained by heating sodium vanadate with acetic acid was redispersed in acetic acid, so that at least part of the reddish precipitate redissolved in the acetic acid and this was added to 100 g. of an acetic acid solution containing 40% by weight of acrolein. This solution was treated in an apparatus described under (a) at 10° C. by passing in oxygen under a pressure of 1300 mm. Hg. The yield of monomeric acrylic acid was 93.2%, 87% of the acrolein initially present having undergone reaction.

(f) 2 g. of commercial vanadium pentoxide were dispersed in 10 cm.³ of concentrated acetic acid and, while cooling, 1 cm.³ of 100 vol.% hydrogen peroxide was added. As soon as the evolution of oxygen had ceased, the clear solution was decanted and 2 cm.³ of this solution added to a solution of 40 g. acrolein in 60 g. acetic acid. Into this homogeneous solution, in an apparatus as described under (a), oxygen was passed while the temperature was maintained at 30° C. The absorption of oxygen set in immediately, the rate of absorption is shown, as in experiment (a), by the following:

|  | Seconds |
|---|---|
| After 10 minutes | 30 |
| After 30 minutes | 8 |
| After 45 minutes | 11 |
| After 90 minutes | 17 |
| After 120 minutes | 23 |
| After 180 minutes | 45 |

At the end of three hours, 61% of the original acrolein was oxidised to monomeric acrylic acid, the efficiency being 90%.

(g) To a mixture of 40 g. acrolein, 100 g. anisole and 26 g. acrylic acid 2 cm.³ of a solution of vanadic acid, as prepared under (f) but with addition of 5 cm.³ of acetic anhydride, were added. As described above, this mixture was subjected to the action of oxygen at 30° C. for 1½ hours. 64% of the acrolein was converted to monomeric acrylic acid, the efficiency being 97%.

(h) The experiment as described under (g) was repeated, with the variation that the addition of acrylic acid was omitted. The vanadic acid separated out and no absorption of oxygen occurs. On continuing the experiment, large lumps of a polymer were found adhering to the walls of the reaction vessel.

What I claim is:

1. A process for the manufacture of monomeric acrylic acid which comprises passing molecular oxygen into an anhydrous solution of acrolein in an organic water-miscible solvent at a temperature not in excess of 35° C., said solution containing dissolved vanadic acid.

2. A process for the manufacture of acrylic acid by the oxidation of acrolein with molecular oxygen comprising forming a solution of vanadic acid, introducing said solution as catalyst into a solution of acrolein in a solvent comprising a water-miscible organic solvent so that at least a part of said vanadic acid remains dissolved in the reaction mixture, removing any copresent water by chemical reaction, and thereafter passing oxygen into said reaction mixture whilst maintaining the reaction temperature at a value not exceeding 35° C.

3. A process for the manufacture of acrylic acid by the oxidation of acrolein with molecular oxygen comprising forming a solution of vanadic acid, introducing said solution as catalyst into a solution of acrolein in a solvent comprising a water-miscible organic solvent so that at least a part of said vanadic acid remains dissolved in the reaction mixture, removing any copresent water by chemical reaction, and thereafter passing oxygen under super-atmospheric pressure into said reaction mixture whilst maintaining the reaction temperature at a value not exceeding 35° C.

4. A process for the manufacture of acrylic acid by the oxidation of acrolein with molecular oxygen comprising forming a solution of vanadic acid, introducing said solution as catalyst into a solution of acrolein in a solvent comprising a water-miscible organic solvent so that at least a part of said vanadic acid remains dissolved in the reaction mixture thereafter passing oxygen into said reaction mixture, removing any copresent water by chemical reaction, whilst maintaining the reaction temperature at a value not exceeding 35° C. and discontinuing the oxidation when a conversion of not more than 70% of the acrolein has been effected.

5. A process for the manufacture of acrylic acid by the oxidation of acrolein with molecular oxygen comprising forming a solution of vanadic acid, introducing said solution as catalyst into a solution of acrolein in a solvent comprising a water-miscible organic solvent so that at least a part of said vanadic acid remains dissolved in the reaction mixture, removing any copresent water by chemical reaction, thereafter passing oxygen under superatmospheric pressure into said reaction mixture whilst maintaining the reaction temperature between 20° and 30° C. and discontinuing the oxidation when a conversion of not more than 70% of the acrolein has been effected.

6. A process for the manufacture of acrylic acid by the oxidation of acrolein with molecular oxygen comprising forming a solution of vanadic acid, introducing said solution as catalyst into a solution of acrolein in a solvent comprising a water-miscible organic solvent so that at least a part of said vanadic acid remains dissolved in the reaction mixture, removing any copresent water by chemical reaction, thereafter passing oxygen under superatmospheric pressure not exceeding three atmospheres into said reaction mixture whilst maintaining the reaction temperature between 20° and 30° C. and discontinuing the oxidation when a conversion of not more than 70% of the acrolein has been effected.

7. A process for the manufacture of acrylic acid by the oxidation of acrolein with molecular oxygen characterized by reacting a vanadic acid salt with an acid so that vanadic acid is precipitated, dissolving said freshly prepared vanadic acid in a substantially anhydrous water-miscible solvent, using the vanadic acid solution thus obtained as catalyst and maintaining a reaction temperature not in excess of 35° C.

8. A process for the manufacture of acrylic acid by the oxidation of acrolein with molecular oxygen characterised by reacting vanadium pentoxide with hydrogen peroxide in the presence of acetic acid to produce a solution of vanadic acid, adding sufficient acetic anhydride to react with all the water present in the solution, using said solution as catalyst and maintaining a reaction temperature not in excess of 35° C.

9. A process for the manufacture of acrylic acid by the oxidation of acrolein with molecular oxygen comprising forming a solution of vanadic acid by reacting a vanadic acid salt with an acid so that vanadic acid is precipitated, dissolving said freshly prepared vanadic acid to form a solution thereof in a substantially anhydrous water-miscible solvent, introducing said solution as catalyst into a solution of acrolein in a solvent comprising a water-miscible organic solvent so that at least a part of said vanadic acid remains dissolved in the reaction mixture and thereafter passing oxygen into said reaction mixture whilst maintatining the reaction temperature at a value not exceeding 35° C.

10. A process for the manufacture of acrylic acid by the oxidation of acrolein with molecular oxygen comprising forming a solution of vanadic acid by reacting vanadium pentoxide with hydrogen peroxide in the presence of acetic acid, introducing said solution as catalyst into a solution of acrolein in a solvent comprising a water-miscible organic solvent so that at least a part of said vanadic acid remains dissolved in the reaction mixture, removing water by chemical reaction, and thereafter passing oxygen into said reaction mixture whilst maintaining the reaction temperature at a value not exceeding 35° C.

11. A process for the manufacture of acrylic acid by the oxidation of acrolein with molecular oxygen comprising forming a solution of vanadic acid, introducing said solution as catalyst into a solution of acrolein in a solvent comprising a water-immiscible and a water-miscible organic solvent so that at least a part of said vanadic acid remains dissolved in the reaction mixture, removing any copresent water by chemical reaction, and thereafter passing oxygen into said reaction mixture whilst maintaining the reaction temperature at a value not exceeding 35° C.

12. A process for the manufacture of acrylic acid by the oxidation of acrolein with molecular oxygen comprising forming a solution of vanadic acid, introducing said solution as catalyst into a solution of acrolein in a solvent comprising a water-immiscible and a water-miscible organic solvent so that at least a part of said vanadic acid remains dissolved in the reaction mixture, removing any copresent water by chemical reaction, and thereafter passing oxygen under superatmospheric pressure into said reaction mixture whilst maintaining the reaction temperature between 20° and 30° C.

13. A process for the manufacture of acrylic acid by the oxidation of acrolein with molecular oxygen comprising forming a solution of vanadic acid, introducing said solution as catalyst into a solution of acrolein in a solvent comprising a water-immiscible and a water-miscible organic solvent so that at least a part of said vanadic acid remains dissolved in the reaction mixture, removing any copresent water by chemical reaction, thereafter passing oxygen under superatmospheric pressure into said reaction mixture whilst maintaining the reaction temperature between 20° and 30° C. and discontinuing the oxidation when a conversion of not more than 70% of the acrolein has been effected.

KARL HEINRICH WALTER TUERCK.